United States Patent
Sakamoto

(10) Patent No.: US 7,145,278 B2
(45) Date of Patent: Dec. 5, 2006

(54) PERMANENT MAGNET TYPE THREE-PHASE STEPPING MOTOR

(75) Inventor: Masafumi Sakamoto, Gunma (JP)

(73) Assignee: Japan Servo Co., Ltd., Tokyo (JP), .

( * ) Notice: Subject to any disclaimer, the term of this patent is extended or adjusted under 35 U.S.C. 154(b) by 0 days.

(21) Appl. No.: 11/116,542
(22) Filed: Apr. 28, 2005

(65) Prior Publication Data

US 2005/0194846 A1 Sep. 8, 2005

Related U.S. Application Data

(62) Division of application No. 10/196,982, filed on Jul. 17, 2002, now Pat. No. 6,903,476.

(30) Foreign Application Priority Data

Jul. 24, 2001 (JP) .............................. 2001/223010

(51) Int. Cl.
*H02K 37/10* (2006.01)
(52) U.S. Cl. .............................. 310/156.64; 310/49 R; 310/254; 310/261
(58) Field of Classification Search .............. 310/49 R, 310/112, 114, 126, 156.64, 156.65, 162, 179, 310/180, 187, 254, 261; 318/254
See application file for complete search history.

(56) References Cited

U.S. PATENT DOCUMENTS

| 3,866,104 A | 2/1975 | Heine |
| 4,234,808 A | 11/1980 | Geppert |
| 4,528,473 A * | 7/1985 | Tezuka .................. 310/256 |

(Continued)

FOREIGN PATENT DOCUMENTS

EP 54099910 8/1979

(Continued)

OTHER PUBLICATIONS

*An Optimized Module-type Hybrid Stepper Motor for Spacecraft Solar Array Drive*, K.R. Rajagopal, et al., 7808-3773-5/97/$10.00 © 1997 IEEE (7 pgs).

(Continued)

Primary Examiner—Darren Schuberg
Assistant Examiner—David W. Scheuermann
(74) Attorney, Agent, or Firm—Patterson, Thuente, Skaar & Christensen, P.A.

(57) ABSTRACT

A permanent magnet type three-phase stepping motor that is simple in construction, with reduced vibration, a reduced unbalanced force in the radial direction, and high torque that can be manufactured at a low cost. The permanent magnet type three-phase stepping motor has a stator and a rotor arranged concentrically with the stator and with an air gap therebetween, said stator having three stator poles, and stator windings of three-phase each wound around each stator pole, each of said stator poles having m pieces of stator pole tooth, said rotor having two split rotor elements, a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, wherein a pitch of the stator pole teeth is smaller than the pitch of the small rotor teeth, m is an integer and $(Nr \pm 2^k)/3$, Nr is $3n \pm 1$, n is an integer not less than 1, and k is an integer not less than 1 and not more than 4.

3 Claims, 5 Drawing Sheets

U.S. PATENT DOCUMENTS

| | | | |
|---|---|---|---|
| 4,672,253 A | | 6/1987 | Tajima |
| 4,748,362 A | * | 5/1988 | Hedlund .................... 310/168 |
| 4,983,867 A | | 1/1991 | Sakamoto |
| 5,289,064 A | | 2/1994 | Sakamoto |
| 5,309,051 A | | 5/1994 | Kobori |
| 5,708,310 A | * | 1/1998 | Sakamoto et al. ........ 310/49 R |
| 5,982,118 A | * | 11/1999 | Gotou et al. ................ 318/254 |
| 6,160,330 A | | 12/2000 | Sakamoto |
| 6,249,066 B1 | * | 6/2001 | Ikegami et al. ........... 310/49 R |
| 6,552,451 B1 | * | 4/2003 | Ikegami et al. ........... 310/49 R |

FOREIGN PATENT DOCUMENTS

| | | |
|---|---|---|
| EP | 61069360 | 4/1986 |
| EP | 03212149 | 9/1991 |
| EP | 06038488 | 2/1994 |
| EP | 07123685 | 5/1995 |
| EP | 0 993 102 A1 | 4/2000 |
| JP | 111233 | 3/1993 |

OTHER PUBLICATIONS

*Characteristics Of Permanent-Magnet Type 3-Phase Stepping Motor*, Akira Tozune and Masafumi Sakamoto, 0-7803-3008-0/95 $4.00 © 1995 IEEE, pp. 748-755.

*High Resolution Hybrid Stepper Motor With Pole Redundancy For Space Application*, R.K. Rajagopal, et al. XP-002227569, pp. 705-710.

*Optimierte Magnete Fur Hybridschrittmotoren*, Eberhard Gollhardt, Sommerda, XP-000846999, F&M 106 (1998) 7-8 © Carl Hanser Verlag, Munchen, pp. 503-506.

* cited by examiner

PERMANENT MAGNET TYPE THREE-PHASE STEPPING MOTOR

RELATED APPLICATION

This application is a division of application Ser. No. 10/196,982 filed Jul. 17, 2002, now U.S. Pat. No. 6,903,476, which claims priority to Japanese Application No. 223010-2001 filed Jul. 24, 2001.

BACKGROUND OF THE INVENTION

1. Field of the Invention

The present invention relates to a permanent magnet type three-phase stepping motor and, more particularly, to a permanent magnet type three-phase stepping motor for use in an apparatus for an office automation or the like.

2. Description of the Prior Art

The vibration generated in the permanent magnet type three-phase stepping motor is smaller than the vibration generated in the permanent magnet type two-phase stepping motor. The number of transistors required for the driving circuit of the three-phase stepping motor is six, whereas the number of transistors required for the driving circuit of the two-phase stepping motor is eight. Accordingly, the three-phase stepping motor is excellent in cost performance. Further, the precision of the positioning of the rotor and the fluctuation of rotation at the low speed can be enhanced if the pole pair number of the rotor is increased. However, the vibration and the noise are generated even in the three-phase stepping motor, because many harmonic waves are generated in the magnetic flux field made by the permanent magnet under the affection of a number of pole teeth.

It is considered that the number of the stator main poles in the three-phase stepping motor is a multiple of three, such as 3, 6, 9, 12, . . . . The motor having three stator main poles is the most simple in construction. Further, it is noted that a lesser number of stator main poles causes larger torque, because the interlinkage magnetic flux per one stator main pole becomes large. Japanese Patent No. 3140814 and the corresponding U.S. Pat. No. 5,289,064 are known as the prior art.

If such conventional stepping motor having three stator main poles is driven by the two-phase exciting manner, an unbalanced electromagnetic force is generated in the radial direction, and harmonic waves are generated due to the large number of small rotor teeth, so that the cogging torque is increased. Further, the center of the air gap between the rotor and the stator is deviated due to the unbalanced electromagnetic force in the radial direction, so that the vibration and the cogging torque are also increased.

In the stepping motor having twelve stator main poles, punched silicon steel plates can be piled while changing in angular position by 90 degrees so as to form the stator core, so that the differences in property of the silicon steel plates due to the rolling direction thereof are cancelled with one another so as to improve the magnetic balance, that the harmonic waves can be reduced because the density of the magnetic flux in the air gap becomes substantially in the form of sine wave, that the fluctuation in thickness of the stator core becomes small, and that the air gap becomes uniform. However, in case that the number of the stator main poles is six or nine, the punched silicon steel plates cannot be piled while changing in angular position by 90 degrees, so that the cogging torque becomes larger than that in case that the number of the stator main poles is twelve, because an oscillation torque is added to the torque generated according to the Fleming's Left-Hand Rule, that is, IBL rule ( where I is current, B is magnetic flux and L is thickness of piled plates ), when the windings are excited by the lower order, such as third or fourth harmonic wave.

Further, in the stepping motor of the conventional construction, if a number Nr of the small rotor teeth becomes large a tooth phase ( mechanical angle ) between the teeth of N pole and S pole of the rotor is 180/Nr and becomes small. Accordingly, the error in the electrical angle becomes large even if the error in the mechanical angle is small. Furthermore, in case that the number of the stator main poles is three or six, the punched silicon steel plates cannot be piled while changing in angular position by 90 degrees, so that the harmonic wave of relatively low order generated due to the unbalance of the magnetic resistance in the magnetic circuit or the unevenness of the air gap is not disappeared between the phases.

Thus, the manufactured stepping motors become different from one another in cogging torque, vibration or noise.

SUMMARY OF THE INVENTION

In order to solve the foregoing problem in the conventional stepping motor, it is an object of the present invention to provide a permanent magnet type three-phase stepping motor comprising a stator and a rotor arranged concentrically with the stator and with an air gap therebetween, said stator having three stator poles, and stator windings of three-phase each wound around each stator pole, each of said stator poles having m pieces of stator pole tooth, said rotor having two split rotor elements, a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs alternately at a regular pitch in the circumferential direction thereof, wherein a pitch of the stator pole teeth is smaller than the pitch of the small rotor teeth or rotor pole, m is an integer and $(Nr \pm 2^k)/3$, Nr is $3n \pm 1$, n is an integer not less than 1, and k is an integer not less than 1 and not more than 4.

It is another object of the present invention to provide a permanent magnet type three-phase stepping motor comprising a stator and a rotor arranged concentrically with the stator and with an air gap therebetween, said stator having three stator poles, and stator windings of three-phase each wound around each stator pole, each of said stator poles having m pieces of stator pole tooth, said rotor having two split rotor elements, a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs alternately at a regular pitch in the circumferential direction thereof, wherein a pitch of the stator pole teeth in electrical angle is $2\pi \pm \alpha$, $\alpha$ is a deviation in electrical angle between the pitch of the small rotor teeth or rotor pole and the pitch of the stator pole teeth, m is an even number not less than 4, each of $\alpha_1$ and $\alpha_2$ is an electrical angle, $\alpha_2 \leq \alpha \leq \alpha_1$, and $\alpha_1$ and $\alpha_2$ are obtained by Formula 1 and Formula 2.

$$\sum_{k=1}^{m/2} \cos 2\left(k - \frac{1}{2}\right)\alpha_1 = 0 \qquad (1)$$

$$\sum_{k=1}^{m/2} \cos 7\left(k - \frac{1}{2}\right)\alpha_2 = 0 \qquad (2)$$

It is further object of the present invention to provide a permanent magnet type three-phase stepping motor comprising a stator and a rotor arranged concentrically with the stator and with an air gap therebetween, said stator having three stator poles, and stator windings of three-phase each wound around each stator pole, each of said stator poles having m pieces of stator pole tooth, said rotor having two split rotor elements, a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs alternately at a regular pitch in the circumferential direction thereof, wherein a pitch of the stator pole teeth in electrical angle is $2\pi \pm \alpha$, $\alpha$ is a deviation in electrical angle between the pitch of the small rotor teeth or rotor pole and the pitch of the stator pole teeth, m is an odd number not less than 3, each of $\alpha_1$ and $\alpha_2$ is an electrical angle, $\alpha_2 \leq \alpha \leq \alpha_1$, and $\alpha_1$ and $\alpha_2$ are obtained by Formula 3 and Formula 4.

$$1 + \sum_{k=1}^{(m-1)/2} \cos 2k\alpha_1 = 0 \qquad (3)$$

$$1 + \sum_{k=1}^{(m-1)/2} \cos 7k\alpha_2 = 0 \qquad (4)$$

It is still further object of the present invention to provide a permanent magnet type three-phase stepping motor comprising a stator and a rotor arranged concentrically with the stator and with an air gap therebetween, said stator having 3 L pieces of stator pole, and stator windings of three-phase each wound around each stator pole, each of said stator poles having a plurality of stator pole teeth, said rotor having two split rotor elements and a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs alternately at a regular pitch in the circumferential direction thereof, wherein a condition of $0.3 \leq \{(Nr/\pi)(Ws+Wr)/(Ds+Dr)\} \leq 0.5$ is established, where L is an integer not less than 1, Nr is L(3n±1), n is an integer not less than 1, Ds is an inner diameter of the stator, Dr is an outer diameter of the rotor, Ws is a width of the stator pole tooth, and Wr is a width of the rotor tooth or rotor pole.

It is yet further object of the present invention to provide a permanent magnet type three-phase stepping motor comprising a stator and a rotor arranged concentrically with the stator and with an air gap therebetween, said stator having 3K pieces of stator pole, and stator windings of three-phase each wound around each stator pole, each of said stator poles having a plurality of stator pole teeth, said rotor having two split rotor elements and a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs at a regular pitch in the circumferential direction thereof, wherein a condition of $0.3 \leq \{(Nr/\pi)(Ws+Wr)/(Ds+Dr)\} \leq 0.5$ is established, where K is an even number not less than 2, Nr is K/2(6n±1), n is an integer not less than 1, Ds is an inner diameter of the stator, Dr is an outer diameter of the rotor, Ws is a width of the stator pole tooth, and Wr is a width of the rotor tooth or rotor pole.

The three-phase exiting is carried out with respect to the three-phase windings and a current passing through each of the three-phase windings is controlled so as to eliminate an unbalanced force in the radial direction.

The rotor is held by a bracket of non-magnetic material having a portion extending inwardly in the axial direction for supporting the inner peripheral surface of the stator poles.

These and other aspects and objects of the present invention will be better appreciated and understood when considered in conjunction with the following description and the accompanying drawings. It should be understood, however, that the following description, while indication preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

A first embodiment of the present invention will now be explained with reference to the drawings.

Figure 1A:
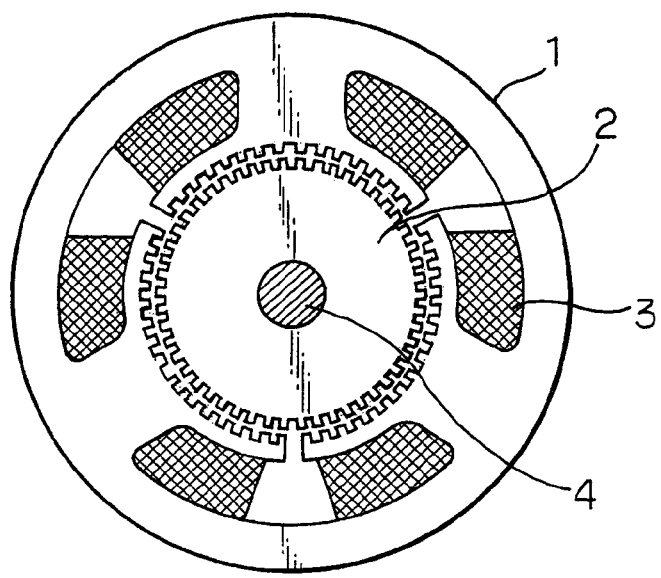
FIG. 1A is a vertically sectioned front view of a permanent magnet type three-phase stepping motor in accordance with the present invention.
Figure 1B:
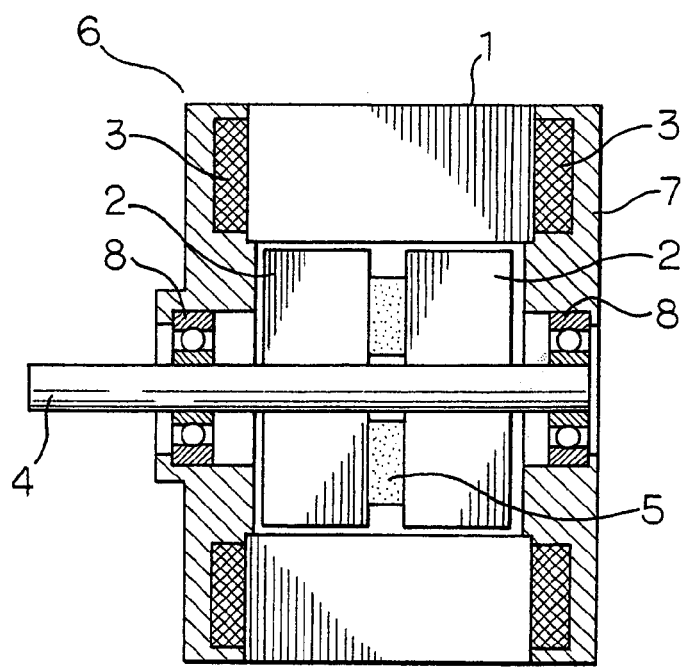
FIG. 1B is a vertically sectioned side view of the stepping motor shown in FIG 1A.

In FIG. 1A and FIG. 1B, a reference numeral 1 denotes a stator having three main poles, 2 denotes two magnetic rotor elements of hybrid type (HB), rotationally shifted from each other by a ½ tooth pitch in position of their magnetic teeth, 3 denotes windings each wound around each stator main pole for forming each phase, 4 denotes a rotor shaft, 5 denotes a permanent magnet held by the two magnetic rotor elements 2 and magnetized so as to form N and S poles in the axial direction thereof, 6 and 7 denote brackets of non-magnetic material, such as aluminum having portions extending in the axial direction for supporting the inner peripheral surface of the stator 1 so as to form an air gap between the stator 1 and the rotor 2, and 8 denotes bearings.

In the three-phase hybrid type stepping motor of the present invention, a pitch of stator pole teeth is set smaller than a pitch of the small rotor teeth, and a number m of stator pole teeth of one main pole is specified to $(N_r \pm 2^k)/3$, and $N_r$ is specified to $(3n \pm 1)$, where m is an integer, $N_r$ is a number of small rotor teeth, n is an integer not less than 1, and k is an integer not less than 1 and not more than 4.

In the stepping motor of this structure, the torque can be increased in proportion to $N_r$ or m substantially. In other words, the torque can be increased by setting the number m to the largest value and the pitch of the stator pole teeth smaller than the pitch of the small rotor teeth, while suppressing the vibration, and preventing the reduction of the torque.

Figure 2A:
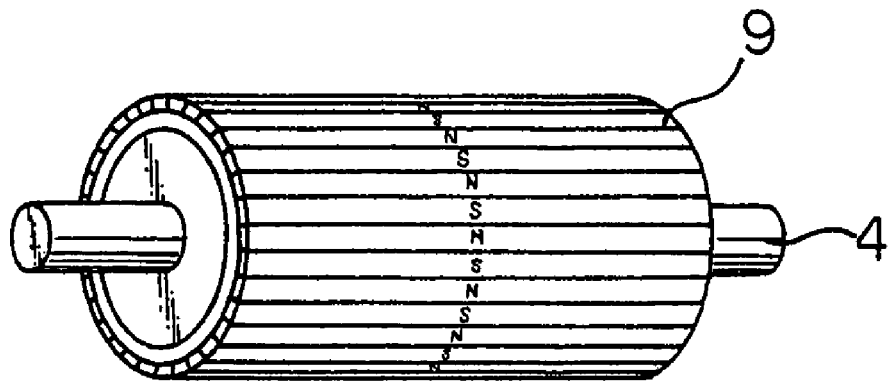
FIG. 2A is a perspective view of a cylindrical magnetic rotor of a permanent magnet type three-phase stepping motor in accordance with the present invention.
Figure 2B:
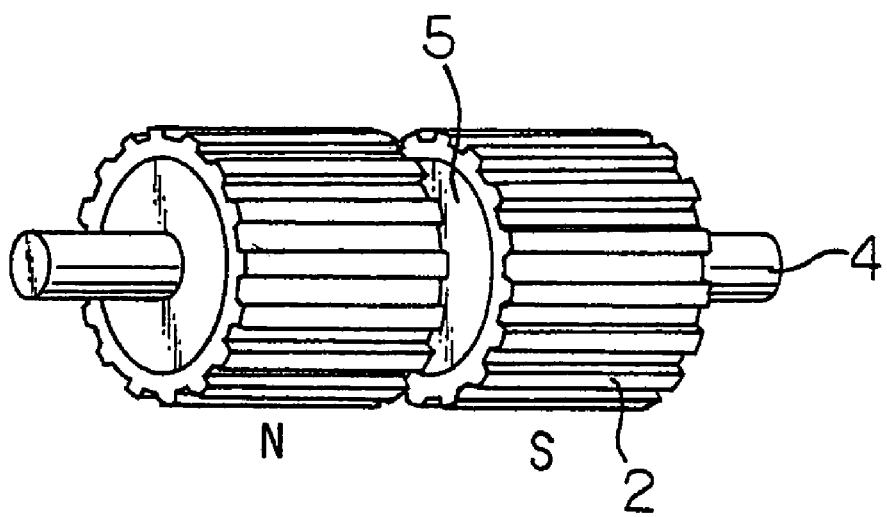
FIG. 2B is a perspective view of a hybrid type rotor of the stepping motor shown in FIG. 1B.

FIG. 1A and FIG. 1B show a stepping motor realized under such conditions that n is 17, $N_r$ is 50, k is 1, and m is 16. The present invention can be applied not only to a three-phase motor having a HB type rotor, but also a three-phase motor having a rotor wherein N poles and S poles are formed alternately on the outer peripheral surface of a cylindrical magnet 9 so as to have a pole pair number of $N_r$, combined with a HB type stator. FIG. 2A shows an appearance of the cylindrical permanent magnet rotor for comparison with that of the HB type rotor shown in FIG. 2B. In FIG. 2A, reference numeral 4 denotes a rotor shaft and 9 denotes a cylindrical permanent magnet.

A second embodiment of the present invention will be explained. The harmonic wave in the air gap and the cogging torque due to the magnetic flux of the permanent magnet can be reduced, if the pitch of the stator pole teeth shown in FIG. 1A is set smaller than that of the small rotor teeth. In order to obtain a good result, it is necessary to know what kinds of harmonic wave are included in the cogging torque or torque which is generated when the windings of the permanent magnet type three-phase stepping motor are excited by electric current. It is noted, however, that the cogging torque of the three-phase stepping motor relates mainly to the sixth harmonic wave and the torque due to the current relates to the odd number harmonic wave.

Formula 5 shows the magnetic flux due to the permanent magnet for each phase in the three-phase stepping motor.

$$3P_0 \gg P_m. \quad (5)$$

$$\left. \begin{array}{l} \Phi_A = (P_m F_m / 3P_0) P_A \\ \Phi_B = (P_m F_m / 3P_0) P_B \\ \Phi_C = (P_m F_m / 3P_0) P_C \end{array} \right\}$$

Formula 6 shows permeances $P_A, P_B, P_C, \overline{P}_A, \overline{P}_B$ and $\overline{P}_C$ of each phase in the three-phase stepping motor.

$$P_A = P_0\{1 + \sum k_n \cos n(N_r \theta)\} \quad (6)$$

$$\left. \begin{array}{l} P_B = P_0\{1 + \sum k_n \cos n(N_r\theta + 2\pi/3)\} \\ P_C = P_0\{1 + \sum k_n \cos n(N_r\theta + 4\pi 3)\} \\ \overline{P}_A = P_0\{1 + \sum k_n \cos n(N_r\theta + \pi)\} \\ \overline{P}_B = P_0\{1 + \sum k_n \cos n(N_r\theta + 2\pi/3 + \pi)\} \\ \overline{P}_C = P_0\{1 + \sum k_n \cos n(N_r\theta + 4\pi/3 + \pi)\} \end{array} \right\}$$

Here, Fm is a magnetomotive force of magnet, Pm is a permeance of magnet, and $P_o$ is the constant of permeance of each phase. A cogging torque $T_A$ of phase A can be calculated from Formula 7.

$$\begin{aligned} T_A &= -(1/2)\delta\{\Phi_A^2 / P_A\}/\delta\theta \quad (7) \\ &= (-N_r P_m^2 F_m^2 / 18 P_0) \\ &\quad (k_1 \sin N_r\theta + 2k_2 \sin 2N_r\theta + 3k_3 \sin 3N_r\theta + \ldots) \end{aligned}$$

Similarly thereto, cogging torques of phase B, phase C, phase $\overline{A}$, phase $\overline{B}$ and phase $\overline{C}$ can be calculated. A cogging torque T obtained by adding harmonic waves of from n=1 (fundamental wave) to n=12 (twelfth harmonic wave) through the phase A to the phase $\overline{C}$, can be expressed by Formula 8.

$$T = (-2N_r P_m^2 F_m^2/P_0)(k_6 \sin 6N_r\theta + 2k_{12} \sin 12N_r\theta + \ldots) \quad (8)$$

It should be understood that it is effective to cancel the sixth harmonic wave mainly, because the cogging torque T is composed of sixth and twelfth harmonic waves. Accordingly, it is preferable to determine a deviation angle α between the pitch of the stator pole teeth and the pitch of the small rotor teeth so as to eliminate the sixth content of the permeance forming the sixth harmonic wave in case of the cogging torque.

On the other hand, a current torque $T_{CA}$ of phase A is EI/ω m, where E is an induced electromotive force, I is a current and ωm is a mechanical angular velocity. The induced electromotive force E can be expressed by Formula 9 and $T_{CA}$ can be expressed by Formula 10.

$$E = d\Phi/dt = dQ(P_A - \overline{P}_A)/dt \qquad (9)$$

$$T_{CA} = (I/\omega m)dQ(P_A - \overline{P}_A)/dt \qquad (10)$$

$(P_A - \overline{P}_A)$ can be obtained from Formula 6, and it is found that the constant $P_o$ and even number order harmonic waves are eliminated, but odd number order harmonic waves are remained. The third harmonic wave has the maximum width in the odd number order harmonic waves. Accordingly, it is preferable to determine the deviation angle α between the pitch of the stator pole teeth and the pitch of the small rotor teeth so as to eliminate the third order content of the permeance forming the third harmonic wave in case of the current torque.

A manner for eliminating the third and sixth harmonic contents in the air gap will be explained hereunder.

Figure 3:
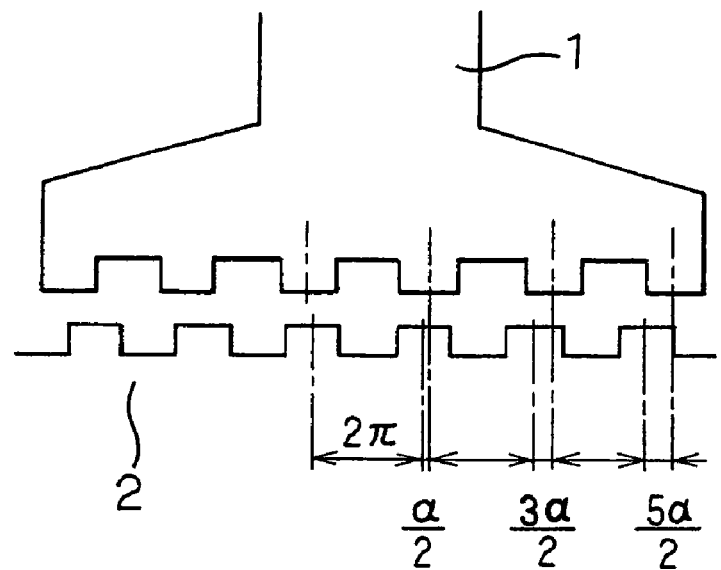
FIG. 3 is an explanation view of a relation between stator teeth and rotor teeth.
Figure 4:
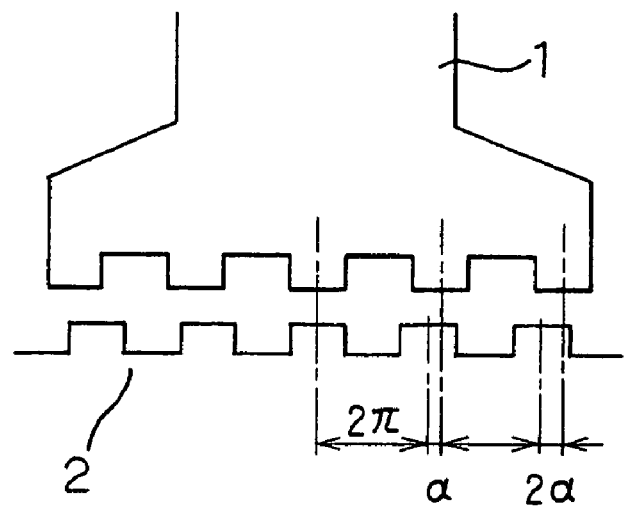
FIG. 4 is an explanation view of a relation between stator teeth and rotor teeth.

FIG. 3 shows a relation between one main stator pole and a corresponding rotor portion in case that the number of the stator pole teeth is an even number, that is, six. FIG. 4 shows a relation between one main stator pole and the corresponding rotor portion in case that the number of the stator pole teeth is an odd number, that is, five. In each case, the pitch of the stator pole teeth is deviated by α (electrical angle) from the pitch of the small rotor teeth. For example, the fundamental wave P1 of permeance in FIG. 3 is expressed by Formula 11, whereas the third permeance P3 is expressed by Formula 12.

$$P_1 = \frac{2}{6}P_0\left(\cos\frac{\alpha}{2} + \cos\frac{3\alpha}{2} + \cos\frac{5\alpha}{2}\right) \qquad (11)$$

$$P_3 = \frac{2}{6}P_0\left(\cos3\times\frac{\alpha}{2} + \cos3\times\frac{3\alpha}{2} + \cos3\times\frac{5\alpha}{2}\right) \qquad (12)$$

Accordingly, the third harmonic wave can be eliminated by setting P3 to zero in Formula 12 and obtaining the electrical angle α. Similarly, f order permeance in case that m is an even number can be eliminated by establishing Formula 13.

$$\sum_{K=1}^{m/2} \cos f\left(K - \frac{1}{2}\right)\alpha = 0 \qquad (13)$$

Accordingly, the electrical angle α is obtained by setting f to 3 in Formula 13 in order to eliminate the third permeance. Further, Formula 14 is established in order to eliminate the seventh permeance.

$$\sum_{k=1}^{m/2} \cos 7\left(k - \frac{1}{2}\right)\alpha_2 = 0 \qquad (14)$$

As stated above, in order to eliminate the sixth harmonic wave, the range of α is specified as $\alpha_2 \leq \alpha \leq \alpha_1$, where $\alpha_1$ is a value when f is 5 and $\alpha_2$ is a value when f is 7. Similarly, in order to eliminate the third harmonic wave, the range of α can be specified as $\alpha_2 \leq \alpha \leq \alpha_1$, where $\alpha_1$ is a value when f is 2 and $\alpha_2$ is a value when f is 4.

In order to eliminate f order permeance in case that m is an odd number in the general expression, the electrical angle α in Formula 15 is obtained.

$$1 + \sum_{k=1}^{(m-1)/2} \cos fk\alpha = 0 \qquad (15)$$

In order to eliminate the seventh order permeance, Formula 16 is established.

$$1 + \sum_{k=1}^{(m-1)/2} \cos 7k\alpha_2 = 0 \qquad (16)$$

Then, the electrical angles $\alpha_1$ and $\alpha_2$ are select as $\alpha_2 \leq \alpha \leq \alpha_1$.

By making the electrical angle α as stated above, the vibration of the motor having three main stator poles wherein the punched silicon steel plates cannot be piled while changing angular position by 90 degrees can be reduced. It is not always necessary to select the electrical angle α strictly in order to eliminate the third and sixth harmonic waves. It is effective to reduce the third and sixth harmonic waves for the three-phase motor. The amplitude of the harmonic wave becomes small if the number of the harmonic order is increased. Accordingly, it may be supposed easily that it is effective to eliminate a low order harmonic wave of large amplitude such as the third harmonic in order to reduce the vibration. In general, it is possible to select the electrical angle α by investigating the order of the harmonic wave of large amplitude in the induced voltage of the motor. Normally, the optimum value of α is selected in the range of α to cancel the second to seventh harmonic waves.

Figure 5:
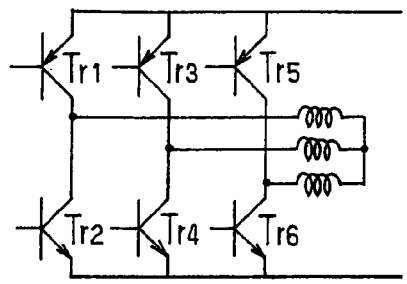
FIG. 5 shows a transistor circuit of a star connection for driving three-phase windings of a permanent magnet type three-phase stepping motor in accordance with the present invention.
Figure 6:
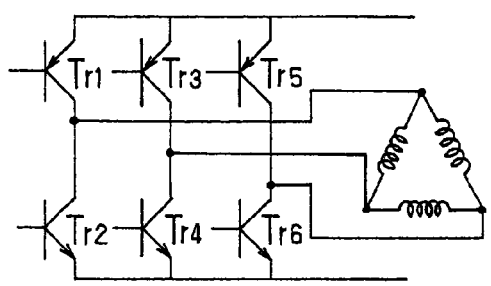
FIG. 6 shows a transistor circuit of a delta connection for driving three-phase windings of a permanent magnet type three-phase stepping motor in accordance with the present invention.
Figure 7:
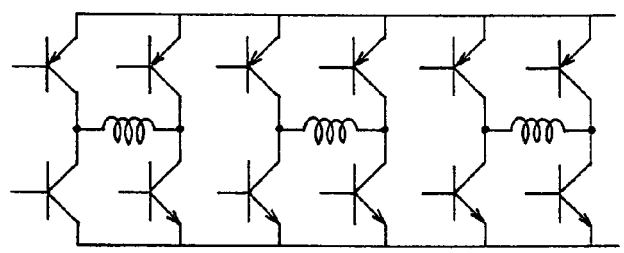
FIG. 7 shows a transistor circuit for independently driving three-phase windings of a permanent magnet type three-phase stepping motor in accordance with the present invention.

In order to carry out the three-terminal exciting for the three-phase stepping motor, six transistors Tr1 to Tr6 are connected in bridge and connected to the three stator windings of a star connection as shown in FIG. 5 or of a delta connection as shown in FIG. 6. In case that the two-phase exciting is carried out in the stepping motor having three main stator poles shown in FIG. 1A and FIG. 1B, only two main stator poles are excited, so that a force in the radial direction applied to the rotor is not cancelled, that a force in the radial direction is applied always to the bearing or the like, and that the noise becomes large. The two-phase exciting can be carried out by switching ON the transistors Tr1 and Tr4 or the transistors Tr5 and Tr4, for example at the same time in the star connection shown in FIG. 5. On the contrary thereto, if the transistors Tr1, Tr4 and Tr6 are switched ON at the same time, the three-phase exciting can be carried out, so that an unbalance force in the radial direction can be reduced to about 13%. In the delta connection shown in FIG. 6, the two-phase exciting can be carried out by switching ON the transistors Tr1 and Tr4 at the same time. However, if the three-phase exciting is carried out, there are no idle windings, so that a torque can be increased. Further, if the three-phase windings are divided and connected to the transistors as shown in FIG. 7, the required number of transistors becomes twice. However, the freedom of the exciting manner is increased remarkably, and the unbalance force in the radial direction can be cancelled perfectly by controlling the current in each phase independently even in the stepping motor having three main stator poles.

Figure 8:
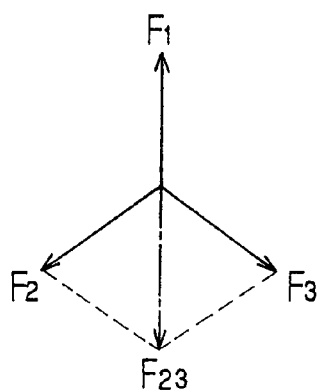
FIG. 8 is an explanation view of unbalanced radial forces generated by the excitation of three-phase windings of a permanent magnet type three-phase stepping motor in accordance with the present invention.

The reason why the unbalance force of about 13% is generated by the three-terminal exciting of the three-phase stepping motor having three main stator poles will be explained with reference to FIG. 8. In case that three windings of star or delta connection are excited, if a current I is passed through one main pole winding of first phase, a current of I/2 is passed through each of the windings of second and third phases. When the stator pole teeth of the first phase are faced perfectly to the corresponding small rotor teeth, the stator pole teeth of the second phase or the third phase are deviated by 30° (electrical angle) from the corresponding small rotor teeth. Accordingly, if an unbalance force in the radial direction F1 is I in FIG. 8, then F2=F3=(I/2)cos 30° and F2+F3=0.87 I. That is, the unbalance force direction of about 13% of F1 is generated. However, in the system shown in FIG. 7, the unbalance force in the radial direction can be cancelled, if a current passing through a winding wound around the stator magnetic pole, of which stator pole teeth are faced perfectly to the corresponding small rotor teeth is reduced by about 13% from the normal value. On the contrary thereto, it is considered that a current passing through the other winding may be increased.

Figure 9:
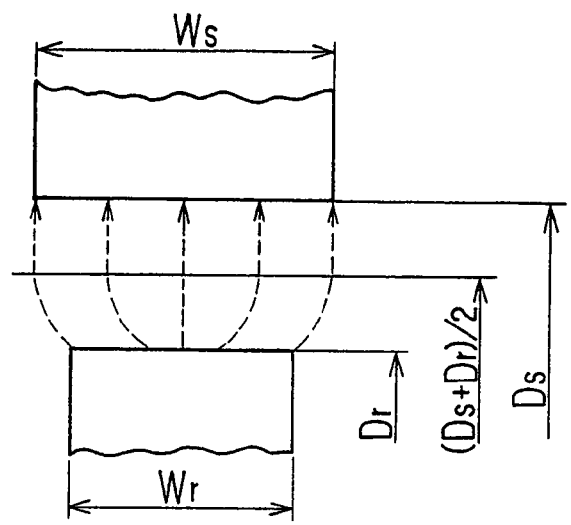
FIG. 9 is an explanation view of a cogging torque generated in a three-phase stepping motor.
Figure 10:
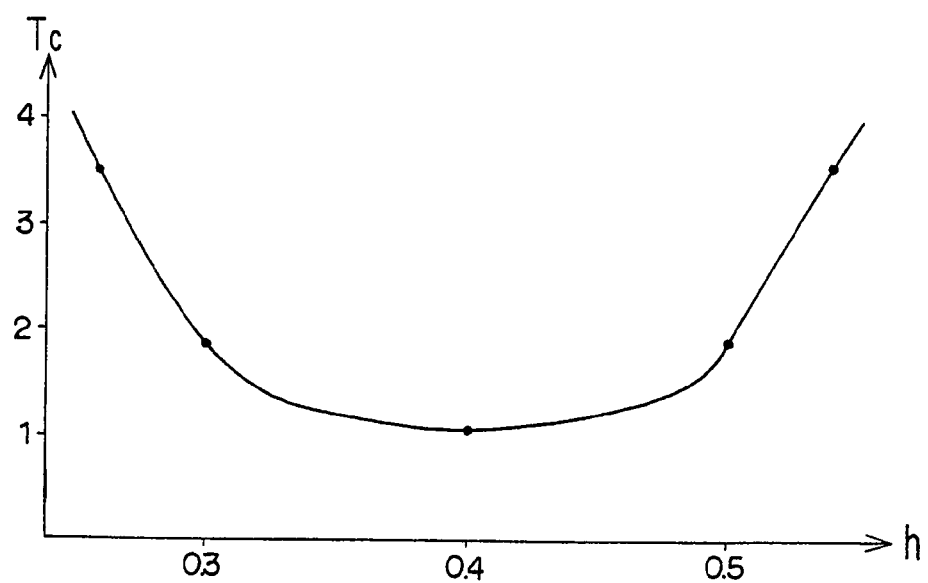
FIG. 10 is a graph explaining a cogging torque in a permanent magnet type three-phase stepping motor in accordance with the present invention.

Other than the three-phase motor having three main stator poles, a three-phase motor having a multiple number of three, such as six, nine or twelve main stator poles is considered as a practical motor. In such a case, the other manner for reducing the vibration and minimizing the cogging torque which is generated by only the permanent magnet of the rotor when the windings are not excited will be explained. The cogging torque is generated due to the harmonic content of the field, and the harmonic content is affected largely by the tooth width of the stator and the tooth width of the rotor. It is recognized experimentally and obtained by the magnetic field analysis that an element for varying the cogging torque is varied by the sum of the tooth width of the stator and the tooth width of the rotor. FIG. 9 shows a relation between a stator pole tooth of a width Ws and a small rotor tooth of a width Wr facing each other. In FIG. 9, Dr is an outer diameter of the rotor and Ds is an inner diameter of the stator. A diameter of the center of an air gap between the rotor and the stator is (Ds+Dr)/2. FIG. 10 shows a relation between a ratio h of (Nr/π)(Ws+Wr)/(Ds+Dr) and the cogging torque Tc, wherein the cogging torque Tc becomes minimum value 1 when h is 0.4. Further, it is understood from FIG. 10 that the cogging torque is reduced largely if the ratio h is selected between 0.3 and 0.5 or to ±25% of 0.4.

It is an effective manner in the permanent magnet type three-phase stepping motor having 3 L or 3K pieces of main stator pole to select the h as $0.3 \leq h \leq 0.5$.

According to the present invention, a permanent magnet type three-phase stepping motor comprises a stator and a rotor arranged concentrically with the stator and with an air gap therebetween, said stator having 3 L pieces of stator pole, and stator windings of three-phase each wound around each stator pole, each of said stator poles having a plurality of stator pole teeth, said rotor having two split rotor elements and a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs alternately at a regular pitch in the circumferential direction thereof, wherein a condition of $0.3 \leq \{(Nr/\pi)(Ws+Wr)/(Ds+Dr)\} \leq 0.5$ is established, where L is an integer not less than 1, Nr is L(3n±1), n is an integer not less than 1, Ds is an inner diameter of the stator, Dr is an outer diameter of the rotor, Ws is a width of the stator pole tooth, and Wr is a width of the rotor tooth or rotor pole.

Further, according to the present invention, a permanent magnet type three-phase stepping motor comprises a stator and a rotor arranged concentrically with the stator and with an air gap therebetween, said stator having 3K pieces of stator pole, and stator windings of three-phase each wound around each stator pole, each of said stator poles having a plurality of stator pole teeth, said rotor having two split rotor elements and a permanent magnet held between the rotor elements and magnetized so as to form N and S poles in the axial direction thereof, and a plurality (Nr) of small rotor teeth formed at a regular pitch on the outer peripheral surface of each of said rotor elements, said two split rotor elements being circumferentially shifted from each other by a ½ pitch of the small rotor teeth, or said rotor being a cylindrical permanent magnet magnetized so as to form a plurality (Nr) of N and S pole pairs at a regular pitch in the circumferential direction thereof, wherein a condition of $0.3 \leq \{(Nr/\pi)(Ws+Wr)/(Ds+Dr)\} \leq 0.5$ is established, where K is an even number not less than 2, Nr is K/2(6n±1), n is an integer not less than 1, Ds is an inner diameter of the stator, Dr is an outer diameter of the rotor, Ws is a width of the stator pole tooth, and Wr is a width of the rotor tooth or rotor pole.

The above manner is suitable for a motor wherein L is 2, n is 8, the number of main stator poles is 6, Nr is 50 and the step angle is 1.2°, wherein L is 4, n is 8, the number of main stator poles is 12, Nr is 100 and the step angle is 0.6°, or wherein K is 4, n is 4, the number of main stator poles is 12, Nr is 50 and the step angle is 1.2°. The number Nr of the small rotor teeth can be obtained from Formula 17 and Formula 18, where n is a natural number.

$$60°/N_r = -/+\{360°/3L - 360°(n\pm\frac{1}{2})/N_r\} \quad (17)$$

$$60°/N_r = -/+\{360°/3K - 360°n/N_r\} \quad (18)$$

Each of the left and right sides of Formula 17 shows a step angle (mechanical angle) of the three-phase motor and accordingly an equation of Nr=L(3n±1) can be obtained therefrom.

Similarly, an equation of Nr=K/2(6n±1) can be obtained from Formula 18.

According to the present invention, a permanent magnet type three-phase stepping motor simple in construction, small in vibration, small in unbalance force in the radial direction, and high in torque can be manufactured with low cost.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A permanent magnet type three-phase stepping motor comprising a stator and a rotor said rotor arranged concentrically with the stator with an air gap therebetween, said stator having three stator poles and stator windings of three-phase each wound around each stator pole, each of said stator poles having m pieces of stator pole teeth, said rotor having two split rotor elements and a permanent magnet held between the two split rotor elements and magnetized to form N and S poles in the axial direction thereof, and a plurality (Nr) of small rotor teeth formed at a regular pitch on an outer peripheral surface of each of said two split rotor elements, said two split rotor elements being circumferentially shifted from each other by a ½ pitch of the small rotor teeth;

wherein a pitch of the stator pole teeth is smaller than the pitch of the small rotor teeth, m is an integer equal to $(Nr \pm 2^k)/3$, Nr is $3n \pm 1$, wherein n is an integer not less than 1, and k is an integer not less than 1 and not more than 4.

2. The permanent magnet type three-phase stepping motor as claimed in claim 1, wherein a three-phase exciting is carried out with respect to the three-phase windings and a current passing through each of the three-phase windings is controlled so as to eliminate an unbalance force in a radial direction.

3. The permanent magnet type three-phase stepping motor as claimed in claim 1, wherein the rotor is held by a bracket of non-magnetic material, the bracket having a portion extending inwardly in the axial direction for supporting the inner peripheral surface of the stator poles.

\* \* \* \* \*